United States Patent [19]

Kuroda

[11] Patent Number: 4,582,183
[45] Date of Patent: Apr. 15, 1986

[54] SLIDING DISPLACEMENT DETECTING APPARATUS

[75] Inventor: Takeshi Kuroda, Kure, Japan
[73] Assignee: Kowa Shoji, Ltd., Tokyo, Japan
[21] Appl. No.: 499,722
[22] Filed: May 31, 1983
[51] Int. Cl.[4] ............................................. F16D 71/00
[52] U.S. Cl. ........................................ 192/7; 192/143; 192/144; 33/DIG. 15
[58] Field of Search ............................ 192/7, 143, 144; 33/166, 170, DIG. 15

[56] References Cited
U.S. PATENT DOCUMENTS

| 3,038,352 | 6/1962 | Murphy | 192/143 X |
| 3,327,826 | 6/1967 | Henschke | 192/144 X |
| 3,465,863 | 9/1969 | Kuts et al. | 192/144 X |
| 4,103,427 | 8/1978 | Ledley, III | 33/166 |
| 4,443,945 | 4/1984 | Takemura et al. | 33/166 |

FOREIGN PATENT DOCUMENTS

| 1412638 | 11/1975 | United Kingdom | 33/166 |
| 1526211 | 9/1978 | United Kingdom | 33/DIG. 15 |

Primary Examiner—Rodney H. Bonck
Assistant Examiner—Richard M. Lorence
Attorney, Agent, or Firm—Edwin E. Greigg

[57] ABSTRACT

In a disclosed displacement detecting apparatus, a nut member retains a plurality of balls to circulate therein while in engagement with a helical groove of a screw shaft. The nut member is unrotatable and linearly movable, and the screw shaft is rotatable and linearly immovable. A rotation detector and a brake are attached to the screw shaft. The nut member may act as a piston of a cylinder in which the nut member is mounted, or may be connected to a separately provided piston of the cylinder.

4 Claims, 6 Drawing Figures

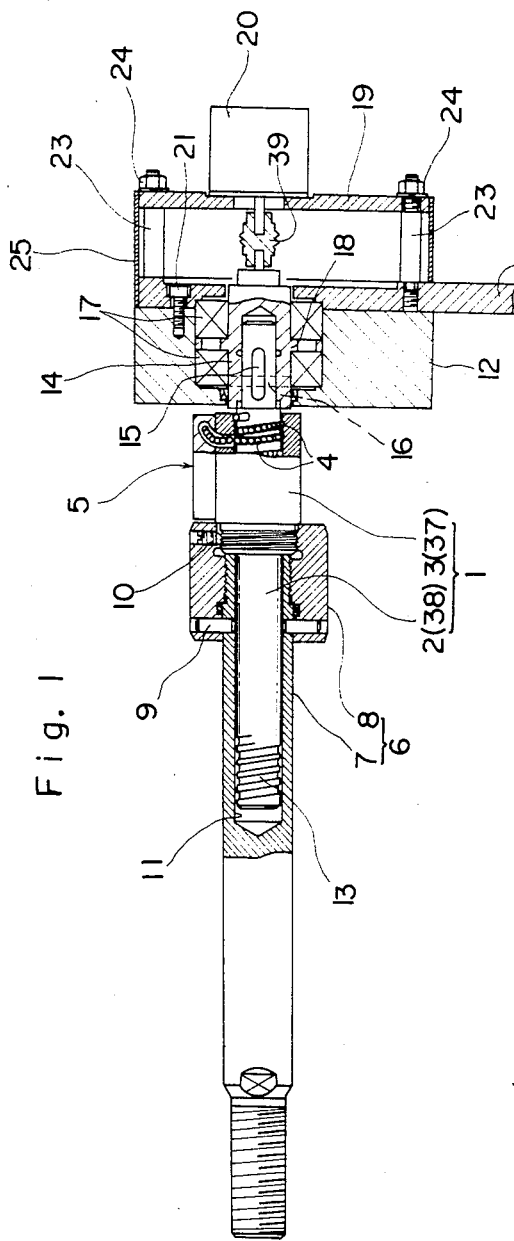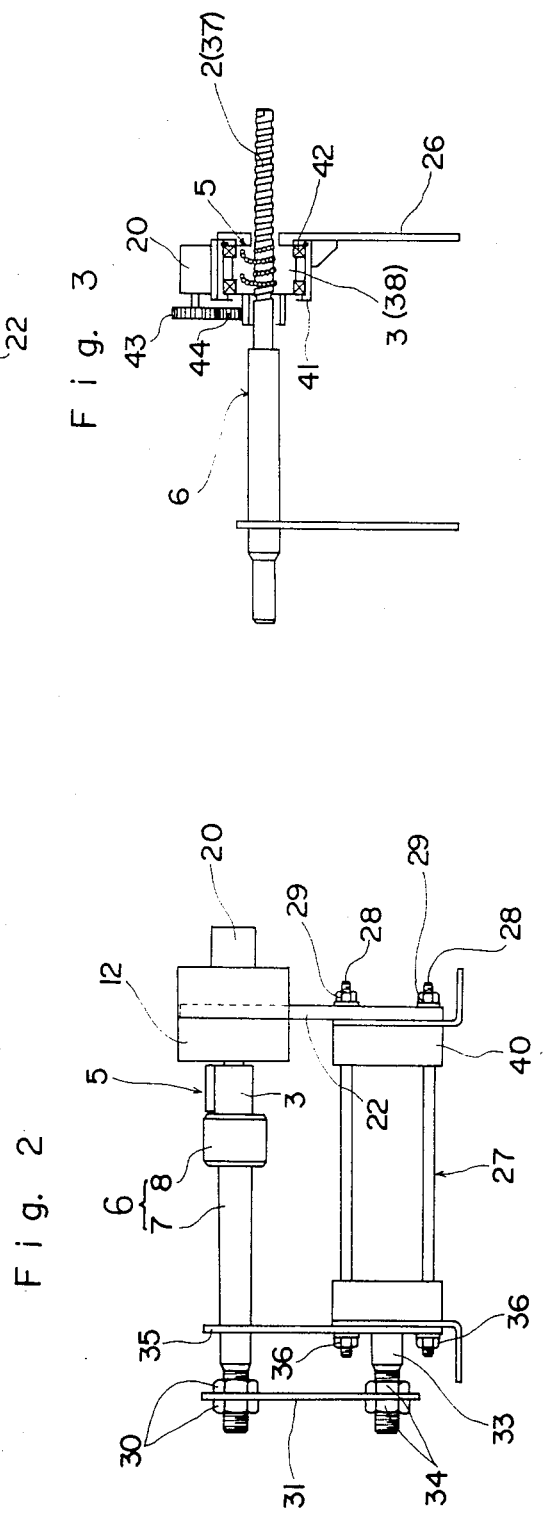

SLIDING DISPLACEMENT DETECTING APPARATUS

BACKGROUND OF THE INVENTION

This invention relates to an apparatus to be attached mainly to a hydraulic or pneumatic cylinder or the like which makes linear reciprocating movements, for detecting sliding displacements thereof.

To detect stroke displacements of a fluid pressure cylinder it has been general practice to use a limit switch, a proximity switch or a photoelectric switch which carries out detection through contact with or approach by a piston rod or a suitable element connected thereto. An on and off operation of the switch is transmitted through a control means to an electromagnetic valve mounted in a pressure fluid (i.e. oil or air) circuit to open and close the valve. This prior art construction has a problem that detection in a direct manner of stroke displacements makes it the more difficult to carry out a minute and precise detecting performance.

Under the circumstances, there has been a strong desire for a detecting apparatus which is attached, as if an adapter, to a newly maufactured or existing cylinder to detect its displacements with high precision. As an alternative to such an apparatus a cylinder has been desired which itself is provided with a construction to detect its strokes with high precision.

On the other hand, once a displacement is detected with precision as above, it is necessary to apply a reliable braking action to the piston or the cylinder. Known braking mechanisms generally have a construction as shown in FIG. 6. To describe the known construction particularly, a brake case comprising a brake tube 62 and covers 63 at respective ends thereof is provided forwardly of a rod cover 60 and coaxially with a piston rod 61. The brake case contains a rubber element 64 surrounding the piston rod 61 and a press plate 65 therefor. The piston rod is locked by the rubber element 64 when an actuating fluid under pressure is introduced through an inlet and outlet port 66 to expand the rubber element 64 toward its axis. A considerably high fluid pressure is required to effect a desired locking action, and a fluid pressure on the low side may result in an error in the braking position. Therefore, a braking apparatus has also been desired which acts in cooperation with a high precision displacement detector to apply a strong brake to a piston or a cylinder with small energy.

SUMMARY OF THE INVENTION

This invention intends to meet the above requirements.

A primary object of this invention is to provide a sliding displacement detecting apparatus comprising a slide to rotation converter including a screw shaft and a nut member screwed to the screw shaft, one of which constitutes an unrotatable member and the other constitutes a rotatable member operatively connected to a rotation detector.

Another object of the invention is to provide a sliding displacement detecting apparatus having the above construction and suitable for attaching to a fluid pressure cylinder.

A further object of the invention is to provide a sliding displacement detecting apparatus having the above construction and suitable for mounting in a fluid pressure cylinder as a component thereof.

A still further object of the invention is to provide a sliding displacement detecting apparatus including a brake means operable in response to an output signal of the rotation detector.

In order to achieve the above objects the invention employs the following arrangements (I) through (III):

(I) A screw shaft and a nut member screwed thereto constitute a slide to rotation converter to convert a sliding movement to a rotation. One of the screw shaft and the nut member constitutes an unrotatable member fixed to a slidable member such that the unrotatable member and the slidable member have axes parallel (or aligned) to each other. The slidable member has at a forward end thereof an attaching section (i.e. a first attaching section) to be attachable to an object such as a cylinder. The slidable member is to be attached through the first attaching section to the object to be linearly movable and unrotatable, and slidable in a direction parallel to a direction in which the object makes sliding movements.

(II) The other of the screw shaft and the nut member constitutes a rotatable member rotatable and unslidable relative to a second attaching section through which the rotatable member is attached to the object. This rotatable member is operatively connected to a rotation detector.

(III) The rotatable member is provided with a braking means controlled by an output signal of the rotation detector.

The above features (I) and (II) function as follows:

(A) One of the screw shaft and the nut member which constitute the slide to rotation converter, or the unrotatable member, forcibly rotates the other. The angle of rotation $\theta$ of the rotatable member is derived from an equation, $$\theta = 360° \times L/P$$

wherein P is a pitch of a helical groove of the screw shaft, and L is an amount of movement of the unrotatable member or the slidable member. Thus the rotation detector may have a resolution power $\theta$ greatly increased by decreasing the pitch P.

(B) The apparatus is usable by attaching the first and second attaching sections to a fixed portion and a movable portion of the object or cylinder. An extension or contraction of the object moves the slidable member and rotates the rotatable member, an amount of its rotation being detected by the detector. This means that a displacement of the object is detected as greatly magnified and with a high degree of precision.

On the other hand, the above features (I) through (III) all together function as follows:

(C) When one of the screw shaft and the nut member which constitute the slide to rotation converter, or the unrotatable member, is made to slide, the other, or the rotatable member, is forced to rotate as described above. Conversely, when an external thrusting force is applied to the slidable member while the object is standing still, the rotatable member again receives a torque through the unrotatable member. The following equations may be set up:

$$F \times X = F' \times X', \text{ and } X' >> X$$

wherein F is a thrust, X is an amount of movement of a stroke, F' is a torque, and X' is an amount of rotation. Thus the torque F' is greatly decreased compared with the thrust F. The thrust F may effectively be checked by applying a braking action to this slight torque F'.

(D) Where the apparatus is used by attaching the first and second attaching sections to the fixed portion and the movable portion of the object of cylinder, an extension or contraction of the object may be well resisted by a braking action with a far smaller force than the force of extension or contraction as described in paragraph (C) above. This means that the object may be locked at a stopping position reliably and positively. Besides, this stopping position is detected with high precision as described in paragraph (B). In other words, the object is positively maintained by a strong braking action at a stopping position detected with high precision.

Other objects and advantages of this invention will be apparent from the following description.

BRIEF DESCRIPTION OF THE DRAWINGS

FIG. 1 is a sectional view of a first embodiment,

FIG. 2 is a front view of the sliding displacement detecting apparatus of FIG. 1 as attached to a cylinder, FIG. 3 is a front view of a second embodiment.

DETAILED DESCRIPTION OF THE PREFERRED EMBODIMENTS

Figure 4:
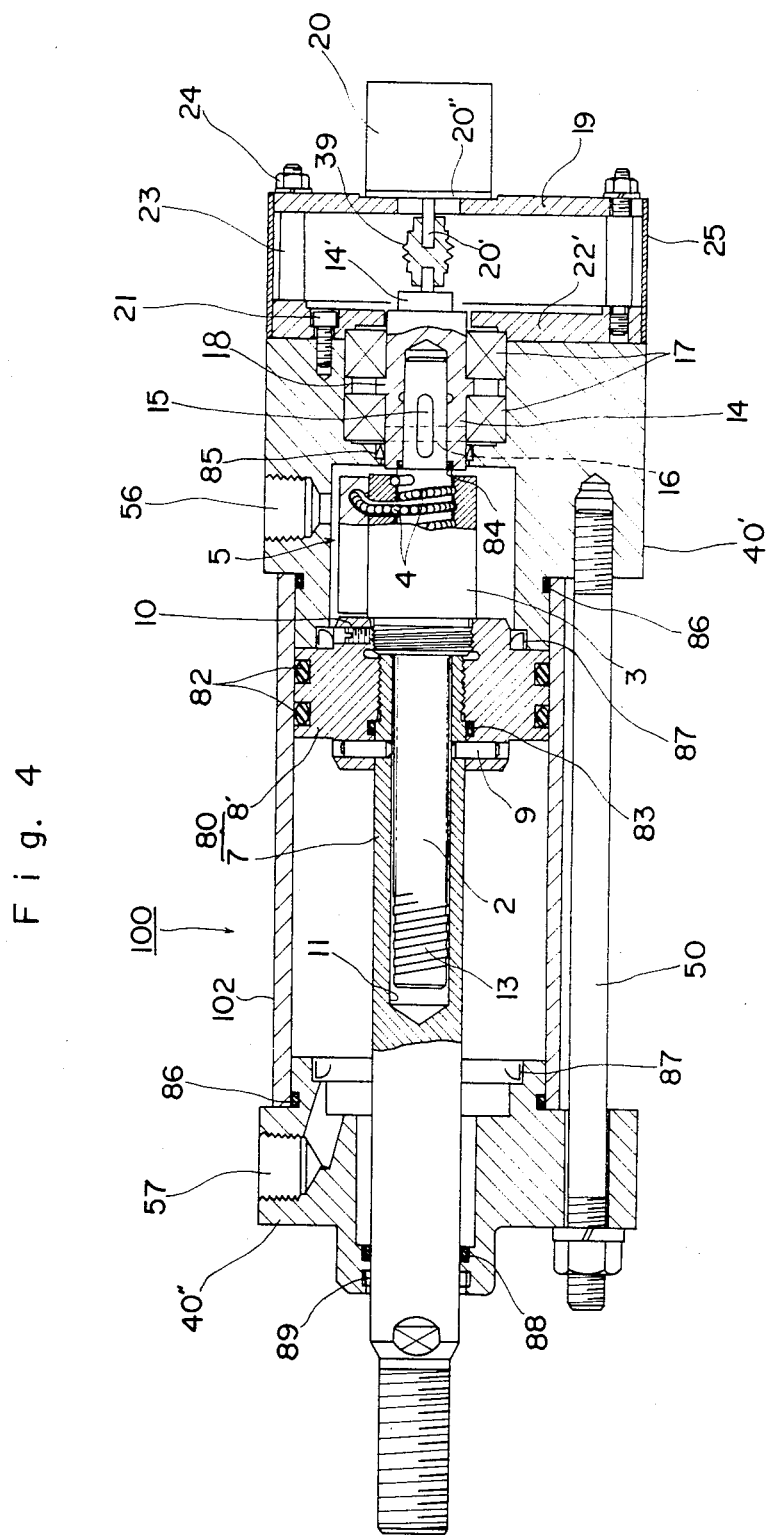
FIG. 4 is a sectional view of a third embodiment.

A first embodiment of this invention will now be described with reference to FIGS. 1 and 2.

A slide to rotation converter 1 comprises a screw shaft 2 and a nut member 3 screwed thereto. The nut member 3 retains a plurality of balls 4 to roll along a helical groove of the screw shaft 2 while circulating within the nut member 3. In other words, the screw shaft 2 and the nut member 3 combine to constitute a ball screw 5 in this example.

A slidable member 6 comprises a rod 7 and a tube 8 screwed and fixed by pins 9 to a base end thereof. The nut member 3 is screwed and fixed by a screw 10 to a rear end of the tube 8. Thus the slidable member 6 and the nut member 3 are rigidly interconnected to be immovable relative to each other. The screw shaft 2 is supported at one end thereof by an axial bore 11 of the rod 7 and at the other end by a head 12. The screw shaft 2 comprises a screwed portion 13 and an output portion 14 rigidly connected to each other by a key 15 and a pin 16. The output portion 14 is supported by the head 12 through bearings 17 and includes a flange 18 interposed between the bearings 17 thereby to be locked unslidable relative to the head 12. The screw shaft 2 and the nut member are coaxial with the slidable member 6.

A rotation detector 20 is attached to a holder 19 fixed by nuts 24 to a plurality of bolts 23 projecting from an attaching plate 22 which is bolted as at 21 to the head 12. Number 25 denotes a tubular cover.

The attaching plate 22 constitutes the second attaching section mentioned hereinbefore, which is penetrated by tie rods 28 of a cylinder 27, nuts 29 being used to secure the tie rods 28 to the second attaching section. On the other hand, the rod 7 of the slidable member 6 carries an attaching plate 31 secured by nuts 30 to a forward screwed portion thereof, the attaching plate 31 constituting the first attaching section mentioned hereinbefore. A piston rod 33 of the cylinder 27 extends through the attaching plate 31 and is secured thereto by nuts 34. Number 35 denotes an intermediate guide plate to guide the rod 7 of the slidable member 6. The guide plate 35 is penetrated by and secured, by nuts 36, to the tie rods 28.

In this embodiment the nut member 3 constitutes an unrotatable member 37 secured to the slidable member 6 while the screw shaft 2 constitutes a rotatable member 38. The rotation detector 20 used herein comprises a pulse encoder which is more generally called a "rotary encoder". This device serves to generate pulses in proportion to the rotational angle assumed by the screw shaft 2. Number 39 denotes a flexible coupler connecting the output portion 14 to an input shaft of the rotation detector 20.

The foregoing apparatus operates as follows.

With an extension of the cylinder 27 the slidable member 6 and the nut member 3 move leftward in the drawings which rotates the screw shaft 2, an amount of its rotation being detected by the detector 20. The detected amount of rotation, including the direction, is in one to one relationship with an amount of displacement of the slidable member 6 or the cylinder 27. The amount of rotation $\theta$ corresponds to the amount of displacement X as greatly amplified. Desirably a control signal is given to close an electromagnetic valve mounted in a fluid circuit connected to the cylinder 27 when a detected value agrees with a predetermined value.

With a contraction of the cylinder 27 the screw shaft 2 is rotated in a direction opposite to that in the foregoing case, and an amount of its rotation is detected by the detector 20.

Referring to FIG. 3, a second embodiment shown has, as opposed to the first embodiment, the screw shaft 2 constituting the unrotatable member 37 fixed to the slidable member 6 and the nut member constituting the rotatable member 38. The nut member is rotatably supported by a support tube 41 through bearings 42. Number 43 denotes an input gear of the rotation detector. Number 44 denotes a counter gear to transmit rotation of the nut member 3 to the input gear 43.

The two embodiments described above may be modified as follows:

(i) The nut member 3 may comprise one for a trapezoidal screw. In this instance, a 45 degree lead angle is preferable so as to present little resistance.

(ii) The rotation detector 20 is not limited to the pulse encoder. Its output mode may be of the mechanical nature.

(iii) The controller which receives signals from the rotation detector 20 is not limited in what it controls.

(iv) The mode of attachment to the cylinder 27 of the first attaching section 31 and the second attaching section 22 may be reversed, whereby the first attaching section 31 is attached adjacent the head cover 40 and the second attaching section 22 to the piston rod 33.

The foregoing embodiments have the following advantages:

(a) By attaching the apparatus to an object, displacement of the object is detected with high precision. Consequently, a high precision control can be provided for the object per se or some other mechanism operable in association with the subject.

(b) The object to which the apparatus is attached is, for example, a pneumatic or hydraulic cylinder, new or old. However, it is not limited to cylinders but the apparatus has wide application. It may be used to detect displacement of, for example, a rack of a pinion and rack assembly, a parallel link mechanism, a crank mechanism and so forth.

A third embodiment will now be described with reference to FIG. 4.

In this embodiment a slide to rotation converter is assembled into a fluid pressure cylinder as a component thereof. That is to say, a fluid pressure cylinder is provided which incorporates the detector according to the first embodiment as a component. This third embodiment has the following constructional principles:

(IV) A piston member comprising a piston and a piston rod is mounted in a cylinder body. A nut member identical or similar to the nut member in the preceding embodiments is fixed to the piston member. The nut member and a screw shaft identical or similar to the screw shaft in the preceding embodiments have an axis parallel or aligned to a direction of movement of the piston member.

(V) The screw shaft to which the nut member is screwed is mounted in the cylinder body to be rotatable and unslidable relative thereto. The screw shaft is operatively connected to a rotation detector.

Components shown in FIG. 4 corresponding to those shown in FIGS. 1 through 3 are affixed with like numerals and are not described again. A cylinder body 100 comprises a cylinder tube 102, a head cover 40' and a rod cover 40". Number 50 denotes tie rods and Numbers 56 and 57 denote inlet and outlet ports for a pressure fluid, i.e. oil or air. A piston member 80 which corresponds to the slidable member 6 in the first embodiment consists of a combination of a piston 8' and a piston rod 7. The head cover 40', the piston 8' and the piston rod 7 respectively correspond to the head 12, the tube 8 and the rod 7 in the first embodiment. When this cylinder is attached to another object, the piston member 80 is locked against rotation relative to the cylinder body 100. Number 82 denotes piston packings, and number 83 denotes a piston gasket. A screw shaft 2 comprising a screw portion 13 and an output portion 14 is supported at one end thereof by the head cover 40'. Number 84 denotes an O-ring, and number 85 denotes a packing, both acting to stop leakage of the pressure fluid. The output portion 17 has a flange 18 to lock the screw shaft 2 against displacement relative to the cylinder body 100.

The output portion 14 of the screw shaft 2 extends through the head cover 40' and a plate 22', with a projecting portion 14' thereof connected through a flexible coupler 39 to a driven portion 20' of a rotation detector 20. The rotation detector or pulse encoder 20 is fixed at a fixing portion 20" thereof to a holder 19.

Number 86 denotes a tube gasket, number 87 denotes a cushion ring, number 88 denotes a rod packing, and number 89 denotes a dust wiper.

This cylinder operates as follows:

With introduction of the pressure fluid via the inlet and outlet port 56, the piston member 80 and the nut member 3 move leftward in the drawings, which rotates the screw shaft 2, an amount of its rotation being detected by the detector 20. When the fluid is introduced through the other inlet and outlet port 57, the screw shaft 2 rotates in a direction opposite to that in the above case, and an amount of its rotation is detected by the detector 20.

The above third embodiment may be modified as follows:

(i) Means to lock the piston member 80 against rotation relative to the cylinder body 100:
1. A rod extending through the piston member is supported by the cylinder body.
2. The piston rod 7 and the rod cover 40" have a noncircular section.
3. The piston 8' and the tube 102 have a noncircular section.

(ii) Attachment of the nut member 3 to the piston member 80:
1. The nut member is axially disaligned from the piston member while retaining a parallel relationship therebetween.
2. The nut member is attached to the piston rod 7.

(iii) The nut member 3 comprises one for a trapezoidal screw. In this instance a 45 degree lead angle is preferable so as to present little resistance.

(iv) The rotation detector 20 is not limited to the pulse encoder. Its output mode may be of the mechanical nature.

(v) The controller which receives signals from the rotation detector 20 is not limited in what it controls.

As will be understood from the foregoing description, in the third embodiment movement of the piston member caused by applying or removing fluid pressure moves the nut member at the same time, which rotates the screw shaft. Therefore, a displacement of the piston member relative to the cylinder body is detected with a high degree of precision. Consequently, the invention facilitates a high precision control of the cylinder per se or some other mechanism operable in association with this cylinder. Further, troublesome work heretofore required when attaching the detector to a separate cylinder is no longer necessary, for according to the invention the detector is assembled together with the cylinder body as a component of the cylinder from the start, to detect a displacement of the piston member. Therefore, good initial assembly work is adequate and requires no troublesome operation at a later stage of actual use. Besides, this construction is free from control errors due to inaccuracy of assembly.

Figure 5:
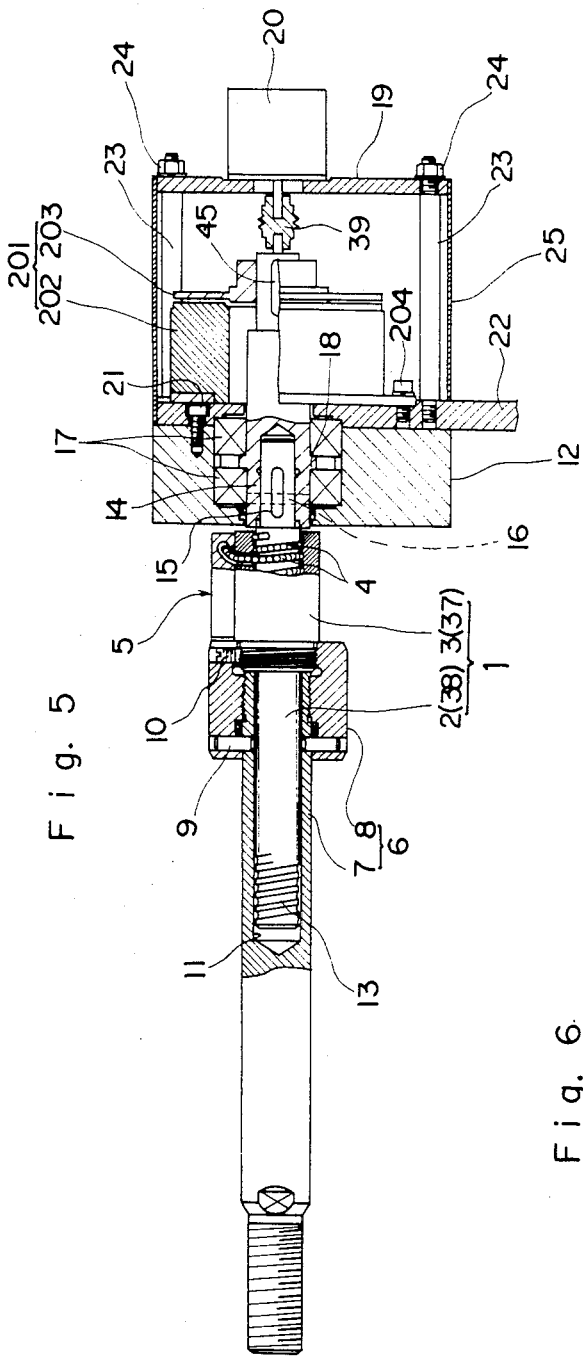
FIG. 5 is a sectional view of a fourth embodiment.
Figure 6:
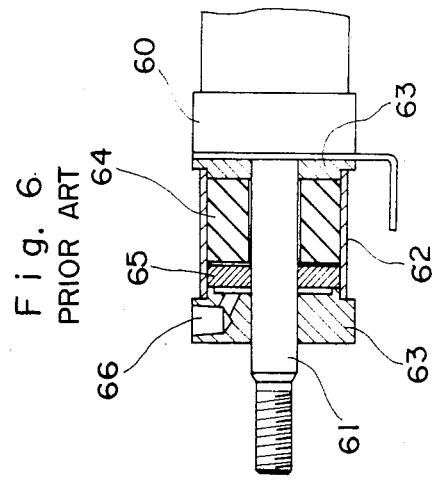
FIG. 6 is a sectional view of a known brake assembly.

A fourth embodiment of the invention will hereinafter be described with reference to FIG. 5, in which components corresponding to those shown in FIG. 1 are affixed with like numberals and their desciption is not repeated. This embodiment includes a brake assembly for the detecting apparatus in the first embodiment. The apparatus of the second and third embodiments may of course also be provided with a brake assembly in a similar manner.

Number 201 denotes a brake mounted on a screw shaft 2, which is an electromagnetic brake in this example. The electromagnetic brake 201 comprises a main body 202 housing an electromagnetic attraction coil and a magnetic rotary disc 203 to be attracted thereto. The main body 202 is fixed to a mounting plate 22 by bolts 24. The disc 203 is mounted on an output shaft portion 14 to be axially slidable thereon and rotatable together with the output shaft portion 14 by means of a key 205.

The attaching plate 22 constitutes the second attaching section mentioned previously which is fixed to tie rods of a cylinder (not shown). On the other hand, a slidable member 6 includes a rod 7 attached at a forward screw portion thereof to a piston rod of the cylinder through the first attaching section (not shown) mentioned hereinbefore.

In this embodiment also, a nut member 3 constitutes an unrotatable member 37 fixed to the slidable member 6, with a screw shaft 2 constituting a rotatable member. The rotation detector 20 herein comprises a pulse encoder.

The described construction operates as follows:

With an extension of the cylinder not shown, the slidable member 6 and the nut member 3 move leftward in the drawing. An amount of displacement of the slidable member 6 or the cylinder, including the direction, is in one to one relationship with an amount of rotation detected by the pulse encoder 20. A control signal is given by a controller (not shown) to close an electromagnetic valve mounted in a fluid circuit connected to the cylinder and at the same time actuate the electromagnetic brake 201 when the detected value agrees with a predetermined value of rotation.

With a contraction of the cylinder the screw shaft 2 is rotated in a direction opposite to that in the above case, and an amount of its rotation is detected by the detector 20. When the detected amount reaches the predetermined value, the electromagnetic valve is closed thereby to actuate the brake.

The fourth embodiment may be modified as follows:

(i) The nut member 3 comprises one for a trapezoidal screw.

(ii) The rotation detector 20 may comprise anything other than the pulse encoder.

(iii) The controller may include a plurality of objects including the brake for its control action which is given when the rotation detector 20 is input.

(iv) The brake 201 may comprise a type other than the electromagnetic, such as a hydraulic brake, a band brake or a drum brake.

(v) The mode of attachment to the cylinder of the first attaching section and the second attaching section may be reversed, whereby the first attaching section is attached adjacent the head cover and the second attaching section is attached to the piston rod of the cylinder.

Thus the fourth embodiment produces the following effects:

By attaching this apparatus to an object such as a cylinder a strong braking action is applied at a detected stopping position. Moreover, the brake needs a smaller driving energy than in the prior art. It does not matter whether the object to which the apparatus is attached is an existing instrument or a newly manufactured instrument. This instrument may of course be a pneumatic cylinder or a hydraulic cylinder. The apparatus is not limited in application to the cylinder but may be used widely to apply brakes to sliding or other displacements of, for example, a rack of a pinion and rack assembly, a parallel link mechanism, crank mechanism and so forth.

We claim:

1. A sliding displacement detecting apparatus comprising:

a rotatable screw shaft having a helical groove and a nut member associated therewith, said nut member being arranged to retain a plurality of balls adapted to roll along the helical groove, the screw shaft, the balls and the nut member together comprising a recirculating ball mechanism serving as a slide-to-rotation converter, a rod having an axial bore arranged to rotatably support a threaded portion of the screw shaft and a head means arranged to rotatably support an output portion thereof, a tube being secured to one extremity of the rod and the nut member being secured to the tube, the rod and the tube together comprising a slidable member, a rotation detector being operatively connected to the output portion of said screw shaft, said rotation detector comprising a pulse encoder, said screw shaft being provided with an electromagnetic brake means mounted thereon, said electromagnetic brake means comprising a main body fixed to a mounting plate and a magnetic rotary disc mounted on the output portion of the screw shaft, said disc being adapted for attraction to the main body, sliding motion of the slidable member being converted to rotational motion of the screw shaft, a predetermined amount of rotation of said screw shaft being detected by the rotation detector for actuating the electromagnetic brake.

2. A sliding displacement detecting apparatus as defined in claim 1, wherein said magnetic rotary disc mounted on the output portion of the screw shaft is axially slidable thereon and adapted for rotation as a unit with the output portion.

3. A sliding displacement detecting apparatus as defined in claim 2, wherein a first attaching plate is secured to the rod and a second attaching plate is secured to the head, said first and second attaching plates being further connected to a cylinder and a piston rod thereof, respectively.

4. A sliding displacement detecting apparatus as defined in claim 14 further comprising a cylinder body including a cylinder tube and a rod cover being provided for housing the slidable member, the screw shaft being mounted in the cylinder body so as to be rotatable and positively unslidable relative thereto, said head further provided with a first inlet and outlet port and said rod cover further provided with second inlet and outlet port, said slidable member being adapted to move in one direction upon introduction of a fluid under pressure via said first inlet and outlet port and further being adapted to move in an opposite direction upon introduction of said fluid under pressure via said second inlet and outlet port.

* * * * *